United States Patent
Liu

(10) Patent No.: US 11,880,107 B2
(45) Date of Patent: Jan. 23, 2024

(54) PIXEL ELECTRODE, DRIVING METHOD OF PIXEL ELECTRODE, AND LIQUID DISPLAY PANEL

(71) Applicant: TCL China Star Optoelectronics Technology Co., Ltd., Guangdong (CN)

(72) Inventor: Yi Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 288 days.

(21) Appl. No.: 17/417,787

(22) PCT Filed: May 19, 2021

(86) PCT No.: PCT/CN2021/094664
§ 371 (c)(1),
(2) Date: Jun. 24, 2021

(87) PCT Pub. No.: WO2022/147943
PCT Pub. Date: Jul. 14, 2022

(65) Prior Publication Data
US 2023/0161203 A1 May 25, 2023

(30) Foreign Application Priority Data
Jan. 5, 2021 (CN) .......................... 202110007718.3

(51) Int. Cl.
*G02F 1/1343* (2006.01)
*G09G 3/36* (2006.01)

(52) U.S. Cl.
CPC ..... *G02F 1/134327* (2013.01); *G09G 3/3648* (2013.01)

(58) Field of Classification Search
None
See application file for complete search history.

(56) References Cited

U.S. PATENT DOCUMENTS

| 2010/0182522 | A1 | 7/2010 | Woo et al. |
| 2016/0377922 | A1* | 12/2016 | Oh .................... G02F 1/133528 349/96 |
| 2021/0028193 | A1* | 1/2021 | Yang ..................... H01L 27/124 |
| 2021/0302791 | A1* | 9/2021 | Um .................... G02F 1/134309 |

FOREIGN PATENT DOCUMENTS

| CN | 102062979 | | 5/2011 |
| CN | 104698697 | * | 6/2015 |
| CN | 111290176 | | 6/2020 |
| CN | 111781779 | | 10/2020 |
| CN | 112213889 | | 1/2021 |
| CN | 112612162 | | 4/2021 |
| CN | 109116638 | * | 12/2021 |
| CN | 113900306 | * | 1/2022 |
| WO | WO 2018/221360 | | 12/2018 |

* cited by examiner

*Primary Examiner* — Ashok Patel

(57) ABSTRACT

The present application provides a pixel electrode, a driving method of the pixel electrode, and a liquid crystal display panel, the pixel electrode comprises a frame electrode and a keel electrode, the frame electrode forms a closed region, the keel electrode is located in the closed region, the keel electrode comprises at least a first trunk and a second trunk vertically intersecting the first trunk, the first trunk and the second trunk divide the closed region into four sub areas, and a shape of an area composed of any two adjacent sub areas is pagoda shaped, to improve a light transmittance of the pixel electrode.

18 Claims, 8 Drawing Sheets

(a) (b) (c) (d) (e) (f)

(a)   (b)   (c)   (d)   (e)

PIXEL ELECTRODE, DRIVING METHOD OF PIXEL ELECTRODE, AND LIQUID DISPLAY PANEL

RELATED APPLICATIONS

This application is a National Phase of PCT Patent Application No. PCT/CN2021/094664 having International filing date of May 19, 2021, which claims the benefit of priority of Chinese Patent Application No. 202110007718.3 filed on Jan. 5, 2021. The contents of the above applications are all incorporated by reference as if fully set forth herein in their entirety.

FIELD AND BACKGROUND OF INVENTION

The present application relates to a field of display, and particularly to a pixel electrode, a driving method of the pixel electrode, and a crystal liquid display panel.

Liquid crystals in a type of high-quality vertical alignment (HVA) of thin film transistor liquid crystal displays (TFT-LCDs) are negative liquid crystals. Before putting the liquid crystals into use, an electric field and a polymerization technology is needed to align them. Since metal wires in the HVA of the TFT-LCDs will occupy space of pixels, a length-width ratio of a pixel electrode is large, and the larger length-width ratio usually cause an abnormal alignment of the liquid crystals, which seriously damages a light transmittance of the pixel electrode.

SUMMARY OF THE INVENTION

The application provides a pixel electrode, a driving method of the pixel electrode, and a liquid crystal display panel, so as to solve a problem that when a length-width ratio of an existing pixel electrode is large, it causes an abnormal alignment of liquid crystals, which seriously damage a light transmittance of the pixel electrode.

Firstly, the present application provides a pixel electrode, wherein the pixel electrode comprises a frame electrode and a keel electrode, the frame electrode forms a closed region, the keel electrode is located in the closed region, the keel electrode comprises at least a first trunk and a second trunk vertically intersecting the first trunk, the first trunk and the second trunk divide the closed region into four sub areas, and a shape of an area composed of any two adjacent sub areas is pagoda shaped, to improve a light transmittance of the pixel electrode.

In some embodiments, the first trunk and the second trunk divide the frame electrode into four segments, the four segments are arranged symmetrical to an intersection of the first trunk and the second trunk, each of the four segments comprises a first sub segment parallel to the first trunk, a second sub segment parallel to the second trunk, and a connection segment connecting the first sub segment and the second sub segment, the connection segment comprises a group of connection sub segments, the connection sub segments comprise a third sub segment parallel to the second sub segment and a fourth sub segment parallel to the first sub segment, the third sub segment and the fourth sub segment are vertically connected, a free end of the third sub segment is connected with the first sub segment, a free end of the fourth sub segment is connected with the second sub segment, a distance between the first sub segment and the first trunk is greater than a distance between the fourth sub segment and the first trunk, and a distance between the second sub segment and the second trunk is greater than a distance between the third sub segment and the second trunk.

In some embodiments, the first trunk and the second trunk divide the frame electrode into four segments, the four segments are arranged to be symmetrical to an intersection of the first trunk and the second trunk, each of the four segments comprises a first sub segment parallel to the first trunk, a second sub segment parallel to the second trunk, and a connection segment connecting the first sub segment and the second sub segment, the connection segment comprises N groups of connection sub segments, the number N is an integer greater than or equal to 2, each of the connection sub segments comprises a third sub segment parallel to the second sub segment and a fourth sub segment parallel to the first sub segment, the third sub segment and the fourth sub segment are vertically connected, a free end of the third sub segment of a first connection sub segment group is connected with the first sub segment, a free end of the fourth sub segment of a $N_{th}$ connection sub segment group is connected with the second sub segment, and a free end of the third sub segment of a $M_{th}$ connection sub segment group is connected with a free end of the fourth sub segment of a $(M-1)_{th}$ connection sub segment group, wherein the number M is any integer greater than 1 and less than or equal to the number N, a distance between the first sub segment and the first trunk is greater than a distance between any of the fourth sub segments and the first trunk, and a distance between the fourth sub segment of the $M_{th}$ connection sub segment group and the first trunk is less than a distance between the fourth sub segment of the $(M-1)_{th}$ connection sub segment group and the first trunk, a distance between the second sub segment and the second trunk is greater than a distance between any of the third sub segments and the second trunk, and a distance between the third sub segment of the $M_{th}$ connection sub segment group and the second trunk is greater than a distance between the third sub segment of the $(M-1)_{th}$ connection sub segment group and the second trunk.

In some embodiments, a ratio of the distance between the fourth sub segment and the first trunk to the distance between the second sub segment and the second trunk is greater than or equal to 1 and less than or equal to 2.5, and a ratio of the distance between the first sub segment and the fourth sub segment to the distance between the third sub segment and the second trunk is greater than or equal to 2 and less than or equal to 3.

In some embodiments, a ratio of a distance between the fourth sub segment of the $N_{th}$ connection sub segment group and the first trunk and the distance between the second sub segment and the second trunk is greater than or equal to 1 and less than or equal to 2.5, a ratio of a distance between the first sub segment and the fourth sub segment of the first connection sub segment group and a distance between the third sub segment of the first connection sub segment group and the second trunk is greater than or equal to 2 and less than or equal to 3, and a ratio of a distance between the fourth sub segment of the $(M-1)_{th}$ connection sub segment group and the fourth sub segment of the $M_{th}$ connection sub segment group and a distance between the third sub segment of the $(M-1)_{th}$ connection sub segment group and the second trunk is greater than or equal to 2 and less than or equal to 3.

In some embodiments, a distance between the second sub segment and the third sub segment is greater than or equal to 5 μm.

In some embodiments, a distance between the second sub segment and the third sub segment of the $N_{th}$ connection sub segment group is greater than or equal to 5 μm, and a distance between the third sub segment of the $M_{th}$ connection sub segment group and the third sub segment of the $(M-1)_{th}$ connection sub segment group is greater than or equal to 5 μm.

In some embodiments, connection points of the third sub segments and the fourth sub segments of the connection sub segment are defined as target connection points, the keel electrode further comprises at least one third trunk, and the third trunk is connected with two of the target connection points which are symmetrical to the second trunk.

In some embodiments, the pixel electrode further comprises a plurality of branch electrodes, the branch electrodes are respectively located in the four sub areas, and the branch electrodes in the same sub area are disposed in interval and arranged in parallel.

Secondly, the present application provides a driving method of a pixel electrode, wherein the driving method of the pixel electrode is used for driving the pixel electrode according to any one of the pixel electrode mentioned above, the pixel electrode comprises a right angle area located in an edge of the pixel electrode and a waist area located in a middle of the pixel electrode, and the driving method of the pixel electrode comprises:

applying a voltage to the pixel electrode so that a deflection electric field of the right angle area guides a deflection of liquid crystals of the waist area to improve the penetration rate of the pixel electrode.

Thirdly, the present application provides a liquid crystal display panel, wherein the liquid crystal display panel comprises a pixel electrode, the pixel electrode comprises a frame electrode and a keel electrode, the frame electrode forms a closed region, the keel electrode is located in the closed region, the keel electrode comprises at least a first trunk and a second trunk vertically intersecting the first trunk, the first trunk and the second trunk divide the closed region into four sub areas, and a shape of an area composed of any two adjacent sub areas is pagoda shaped, to improve a light transmittance of the pixel electrode.

In some embodiments, the first trunk and the second trunk divide the frame electrode into four segments, the four segments are arranged symmetrical to an intersection of the first trunk and the second trunk, each of the four segments comprises a first sub segment parallel to the first trunk, a second sub segment parallel to the second trunk, and a connection segment connecting the first sub segment and the second sub segment, the connection segment comprises a group of connection sub segments, the connection sub segments comprise a third sub segment parallel to the second sub segment and a fourth sub segment parallel to the first sub segment, the third sub segment and the fourth sub segment are vertically connected, a free end of the third sub segment is connected with the first sub segment, a free end of the fourth sub segment is connected with the second sub segment, a distance between the first sub segment and the first trunk is greater than a distance between the fourth sub segment and the first trunk, and a distance between the second sub segment and the second trunk is greater than a distance between the third sub segment and the second trunk.

In some embodiments, the first trunk and the second trunk divide the frame electrode into four segments, the four segments are arranged to be symmetrical to an intersection of the first trunk and the second trunk, each of the four segments comprises a first sub segment parallel to the first trunk, a second sub segment parallel to the second trunk, and a connection segment connecting the first sub segment and the second sub segment, the connection segment comprises N groups of connection sub segments, the number N is an integer greater than or equal to 2, each of the connection sub segments comprises a third sub segment parallel to the second sub segment and a fourth sub segment parallel to the first sub segment, the third sub segment and the fourth sub segment are vertically connected, a free end of the third sub segment of a first connection sub segment group is connected with the first sub segment, a free end of the fourth sub segment of a $N_{th}$ connection sub segment group is connected with the second sub segment, and a free end of the third sub segment of a $M_{th}$ connection sub segment group is connected with a free end of the fourth sub segment of a $(M-1)_{th}$ connection sub segment group, wherein the number M is any integer greater than 1 and less than or equal to the number N, a distance between the first sub segment and the first trunk is greater than a distance between any of the fourth sub segments and the first trunk, and a distance between the fourth sub segment of the $M_{th}$ connection sub segment group and the first trunk is less than a distance between the fourth sub segment of the $(M-1)_{th}$ connection sub segment group and the first trunk, a distance between the second sub segment and the second trunk is greater than a distance between any of the third sub segments and the second trunk, and a distance between the third sub segment of the $M_{th}$ connection sub segment group and the second trunk is greater than a distance between the third sub segment of the $(M-1)_{th}$ connection sub segment group and the second trunk.

In some embodiments, a ratio of the distance between the fourth sub segment and the first trunk to the distance between the second sub segment and the second trunk is greater than or equal to 1 and less than or equal to 2.5, and a ratio of the distance between the first sub segment and the fourth sub segment to the distance between the third sub segment and the second trunk is greater than or equal to 2 and less than or equal to 3.

In some embodiments, a ratio of a distance between the fourth sub segment of the $N_{th}$ connection sub segment group and the first trunk and the distance between the second sub segment and the second trunk is greater than or equal to 1 and less than or equal to 2.5, a ratio of a distance between the first sub segment and the fourth sub segment of the first connection sub segment group and a distance between the third sub segment of the first connection sub segment group and the second trunk is greater than or equal to 2 and less than or equal to 3, and a ratio of a distance between the fourth sub segment of the $(M-1)_{th}$ connection sub segment group and the fourth sub segment of the $M_{th}$ connection sub segment group and a distance between the third sub segment of the $(M-1)_{th}$ connection sub segment group and the second trunk is greater than or equal to 2 and less than or equal to 3.

In some embodiments, a distance between the second sub segment and the third sub segment is greater than or equal to 5 μm.

In some embodiments, a distance between the second sub segment and the third sub segment of the $N_{th}$ connection sub segment group is greater than or equal to 5 μm, and a distance between the third sub segment of the $M_{th}$ connection sub segment group and the third sub segment of the $(M-1)_{th}$ connection sub segment group is greater than or equal to 5 μm.

In some embodiments, connection points of the third sub segments and the fourth sub segments of the connection sub segment are defined as target connection points, the keel electrode further comprises at least one third trunk, and the third trunk is connected with two of the target connection points which are symmetrical to the second trunk.

In some embodiments, the pixel electrode further comprises a plurality of branch electrodes, the branch electrodes are respectively located in the four sub areas, and the branch electrodes in the same sub area are disposed in interval and arranged in parallel.

In some embodiments, the liquid crystal display panel further comprises a thin film transistor array substrate, a color film substrate arranged opposite to the thin film transistor array substrate, the pixel electrode arranged on one side of the thin film transistor array substrate facing the color film substrate, a common electrode arranged on one side of the color film substrate facing the thin film transistor array substrate, and a liquid crystal layer sandwiched between the pixel electrode and the common electrode.

In the present application, the right angle area is arranged near the waist area of the rectangular pixel electrode to form the new pixel electrode, so that a strong deflection electric field generated in the right angle area can extend to the waist area of the new pixel electrode, thus, when a length-width ratio of the pixel electrode is large, liquid crystals in a corresponding liquid crystal region can be aligned normally, and a light transmittance of the pixel electrode can be improved.

DESCRIPTION OF THE SPECIFIC EMBODIMENTS OF THE INVENTION

In order to make the purpose, technical solutions and effects of the present application more clear and definite, the present application is further described in detail with reference to attached drawings and embodiments. It should be understood that the specific embodiments described herein are only used to explain the present application and are not used to limit the present application.

Figure 1:
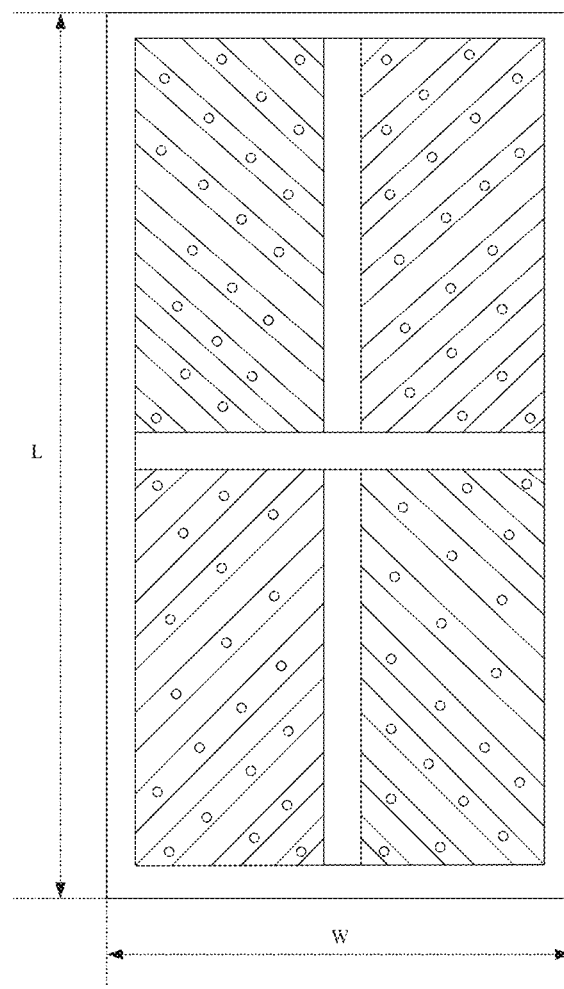
FIG. 1 is a schematic diagram of an existing pixel electrode.
Figure 2:
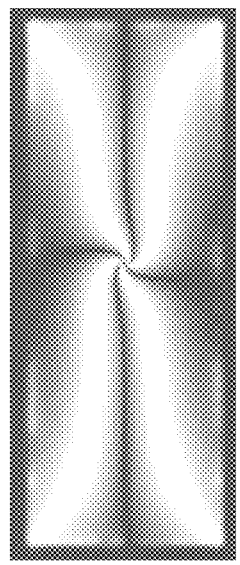
FIG. 2 is a schematic diagram of a deflection of liquid crystals in a corresponding liquid crystal region under an action of a specific electric field when a length-width ratio of the pixel electrode as shown in FIG. 1 is less than 3.5.

FIG. 1 is a schematic diagram of an existing pixel electrode. Please refer to FIG. 1, where existing pixel electrodes are mostly rectangular. Please refer to FIG. 2, when a length-width ratio of the rectangular pixel electrode is less than 3.5, liquid crystals in a liquid crystal region corresponding to the rectangular pixel electrode can be normally aligned in a process of being illuminated by a gradually rising voltage difference, and a cross shaped dark lines appear in the liquid crystal region. Please refer to FIG. 3, when the length-width ratio of the rectangular pixel electrode is greater than or equal to 3.5, an alignment of the liquid crystals in the liquid crystal region corresponding to the rectangular pixel electrode is abnormal, abnormal dark lines appear in the liquid crystal region. That is, a middle part of an original cross shaped dark lines (an inner area of a dotted box shown in FIG. 3) is distorted, which seriously damages a light transmittance of the pixel electrode. In order to solve a problem existing in the prior art, embodiments of the invention provide a new pixel electrode, a driving method thereof, and a liquid crystal display panel having the pixel electrode.

Please refer to FIG. 4, FIG. 6, FIG. 7, and FIG. 8, the new pixel electrode 10 provided by an embodiment of the invention comprises a frame electrode 11 and a keel electrode 12, the frame electrode 11 forms a closed region, the keel electrode 12 is located in the closed region, the keel electrode 12 comprises at least a first trunk 121 and a second trunk 122 vertically intersecting the first trunk 121. The first trunk 121 and the second trunk 122 divide the closed region into four sub areas, namely a first sub area 1111, a second sub area 2222, a third sub area 3333, and a fourth sub area 4444, wherein the first sub area 1111 is adjacent to the second sub area 2222, the second sub area 2222 is adjacent to the third sub area 3333, the third sub area 3333 is adjacent to the fourth sub area 4444, and the fourth sub area 4444 is adjacent to the first sub area 1111. A shape of an area composed of any two adjacent sub areas is pagoda shaped, that is, a shape of an area composed of the first sub area 1111 and the second sub area 2222 is pagoda shaped, a shape of an area composed of the second sub area 2222 and the third sub area 3333 is pagoda shaped, a shape of an area composed of the third sub area 3333 and the fourth sub area 4444 is pagoda shaped, and a shape of an area composed of the fourth sub area 4444 and the first sub area 1111 is pagoda shaped, to improve light transmittance of the pixel electrode.

Figure 4:
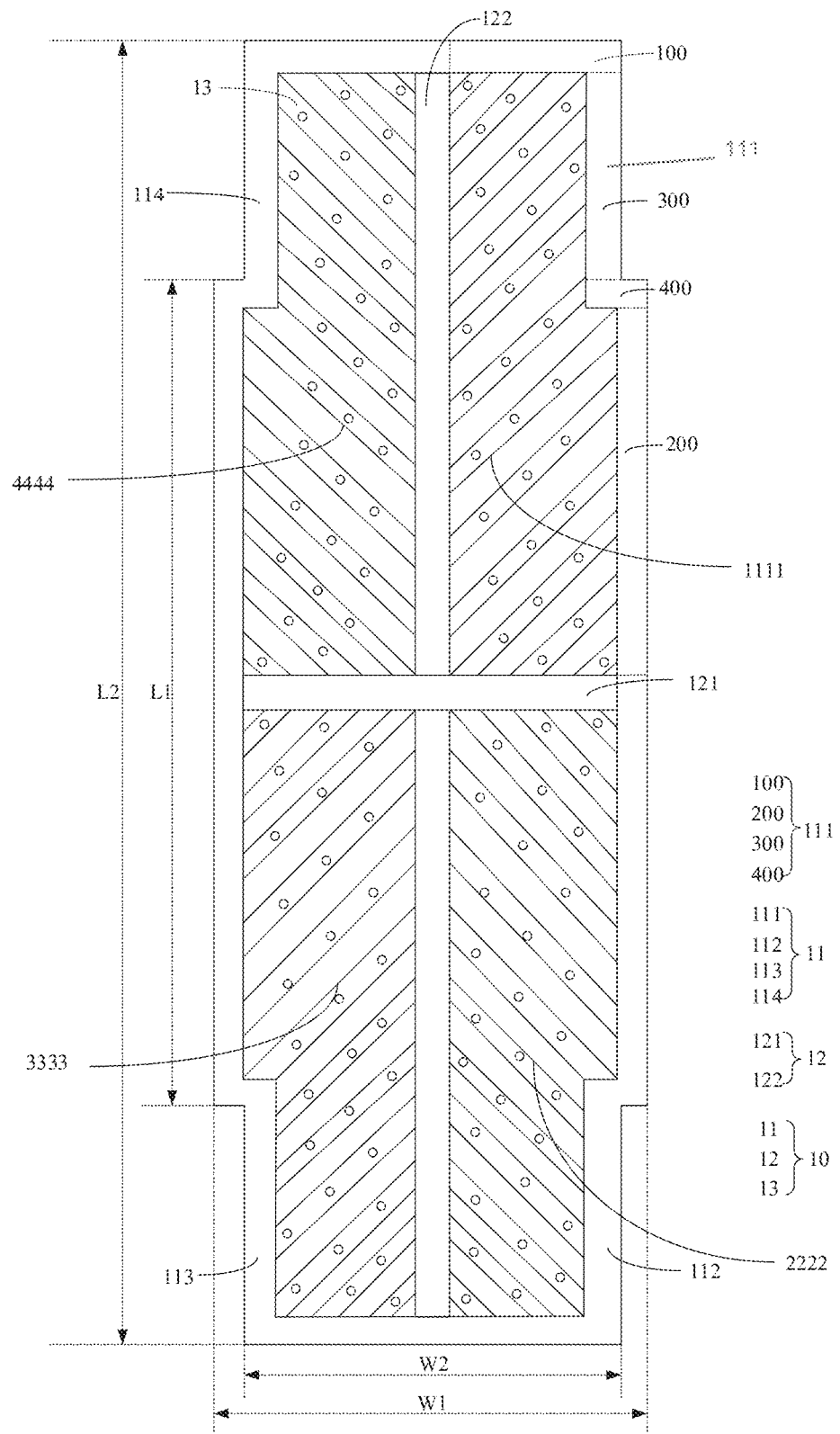
FIG. 4 is a schematic diagram of a first structure of a pixel electrode in an embodiment of the invention.

The frame electrode 11 located in each of the four sub areas is in a ladder shape. Further, frame electrodes 11 in any two adjacent sub areas are symmetrical to the first trunk 121 or the second trunk 122. The pixel electrode 10 shown in FIG. 4 is used for illustration. In FIG. 4, the frame electrode 11 located in each of the four sub areas is in the ladder shape composed of two steps, for example, the frame electrode 11 located in the first sub area 1111 and the frame electrode 11 located in the second sub area 2222 are symmetrical to the first trunk 121. The frame electrode 11 located in the second sub area 2222 and the frame electrode 11 located in the third sub area 3333 are symmetrical to the second trunk 122. The frame electrode 11 located in the third sub area 3333 and the frame electrode 11 located in the fourth sub area 4444 are symmetrical to the first trunk 121, and the frame electrode 11 located in the fourth sub area 4444 and the frame electrode 11 located in the first sub area 1111 are symmetrical to the second trunk 122.

FIG. 4 is a schematic diagram of a first structure of a pixel electrode provided by an embodiment of the invention. Referring to FIG. 4, the pixel electrode 10 comprises the frame electrode 11 and the keel electrode 12, the frame electrode 11 forms the closed region, the keel electrode 12 is located in the closed region, the keel electrode 12 comprises at least the first trunk 121 and the second trunk 122 vertically intersecting the first trunk 121, the first trunk 121 and the second trunk 122 divide the frame electrode 11 into four segments, and the four segments are arranged symmetrical to an intersection of the first trunk 121 and the second trunk 122. The first trunk 121 shown in FIG. 4 is arranged along a horizontal direction, the second trunk 122 is arranged along a vertical direction, and the four segments are a first segment 111, a second segment 112, a third segment 113, and a fourth segment 114 respectively.

Each of the four segments (take the first segment 111 as an example) comprises a first sub segment 100 parallel to the first trunk 121, a second sub segment 200 parallel to the second trunk 122, and a connection segment connecting the first sub segment 100 and the second sub segment 200, the connection segment comprises a group of connection sub segments, the connection sub segments comprise a third sub segment 300 parallel to the second sub segment 200 and a fourth sub segment 400 parallel to the first sub segment 100, the third sub segment 300 and the fourth sub segment 400 are vertically connected, a free end of the third sub segment 300 is connected with the first sub segment 100, a free end of the fourth sub segment 400 is connected with the second sub segment 200, a distance between the first sub segment 100 and the first trunk 121 is greater than a distance between the fourth sub segment 400 and the first trunk 121, and a distance between the second sub segment 200 and the second trunk 122 is greater than a distance between the third sub segment 300 and the second trunk 122.

The pixel electrode 10 provided by the embodiment of the invention will be further explained through a specific experiment.

It should be noted that a pixel electrode used for the experiment adopts a structure of the pixel electrode 10 as shown in FIG. 4, and a length-width ratio L2/W1 of the pixel electrode 10 is 3.5. Please refer to FIG. 5, parts (a), (b), (c), (d), (e), and (f) in FIG. 5 respectively show a deflection of liquid crystals in a liquid crystal region corresponding to the pixel electrode 10 when a voltage difference is 2.5V, 2.6V, 2.7V, 2.8V, 5V, and 8V respectively. Obviously, under any of the above voltage differences, the liquid crystals in the liquid crystal region corresponding to the pixel electrode 10 can be aligned normally, and dark lines in the liquid crystal region are all cross shaped dark lines.

To sum up, the pixel electrode 10 provided by the embodiment of the invention is provided with the connection sub segments in the frame electrode 11, and each of the connection sub segments comprises the third sub segment 300 and the fourth sub segment 400 which are vertically connected. In this way, when the length-width ratio of the pixel electrode 10 is large, the liquid crystals in the corresponding liquid crystal region can be aligned normally, and the light transmittance of the pixel electrode can be improved.

Based on the above embodiment, please continue to refer to FIG. 4, a ratio of the distance between the fourth sub segment 400 and the first trunk 121 (L1/2) to the distance between the second sub segment 200 and the second trunk 122 (W1/2) is greater than or equal to 1 and less than or equal to 2.5, and a ratio of the distance between the first sub segment 100 and the fourth sub segment 400 ((l2−l1)/2) to the distance between the third sub segment 300 and the second trunk 122 (W2/2) is greater than or equal to 2 and less than or equal to 3.

Based on the above embodiment, please continue to refer to FIG. 4, a distance between the second sub segment 200 and the third sub segment 300 is greater than or equal to 5 μm.

Figure 6:
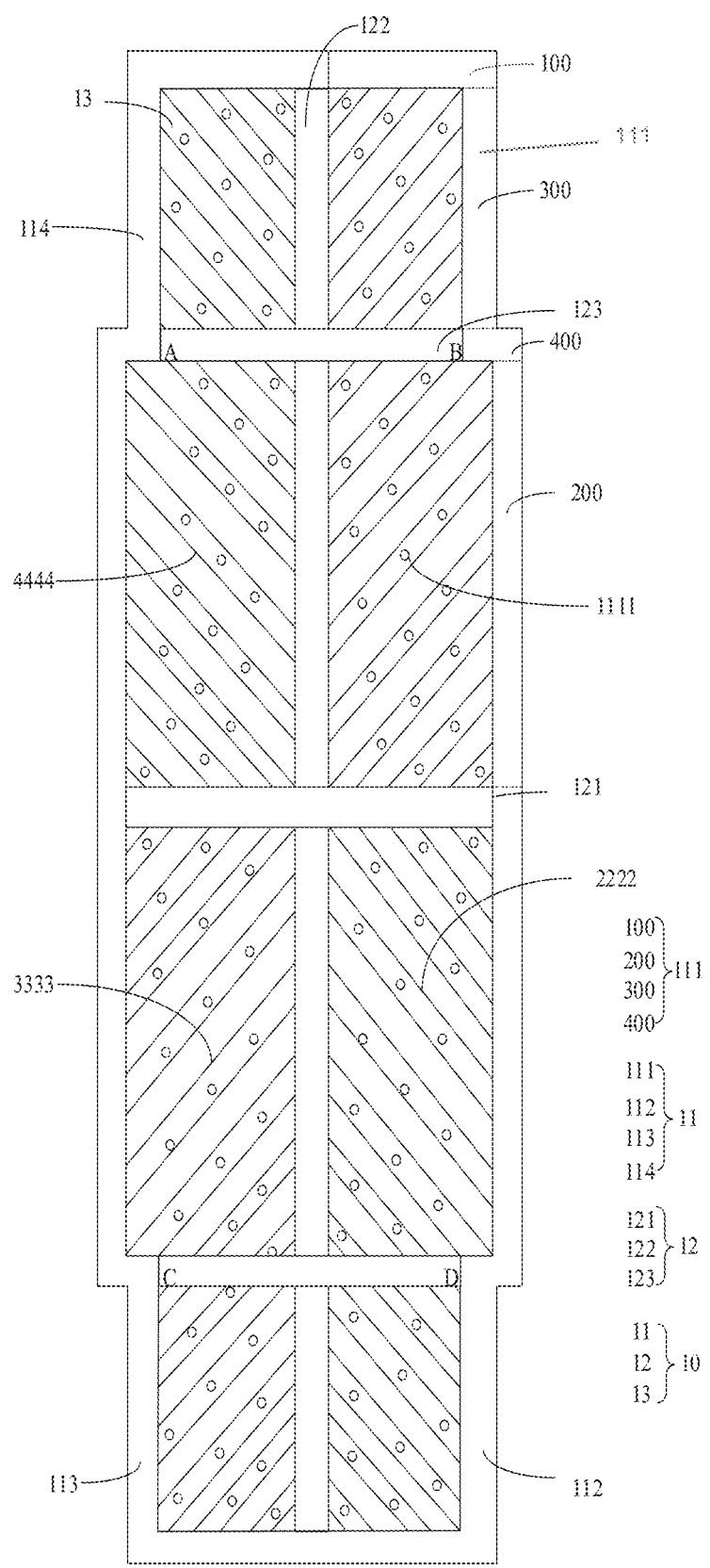
FIG. 6 is a schematic diagram of a second structure of the pixel electrode provided in an embodiment of the invention.

FIG. 6 is a schematic diagram of a second structure of the pixel electrode provided by an embodiment of the invention. Referring to FIG. 6, the structure of the pixel electrode 10 shown in FIG. 6 is similar to the pixel electrode 10 shown in FIG. 4, a difference is that a keel electrode 12 of the pixel electrode 10 shown in FIG. 6 further comprises at least one third trunk 123, connection points of the third sub segments 300 and the fourth sub segments 400 of the connection sub segment are defined as target connection points, and the third trunk 123 is connected with two of the target connection points which are symmetrical to the second trunk 122.

Specifically, the pixel electrode 10 shown in FIG. 6 comprises two third trunks 123, one end of one of the third trunks 123 connects a connection point A of the third sub segment 300 and the fourth sub segment 400 in the fourth segment 114, and the other end connects a connection point B of the third sub segment 300 and the fourth sub segment 400 in the first segment 111; one end of another one of the third trunks 123 connects a connection point C of the third sub segment 300 and the fourth sub segment 400 of the third segment 113, and the other end connects a connection point D of the third sub segment 300 and the fourth sub segment 400 in the second segment 112.

Figure 7:
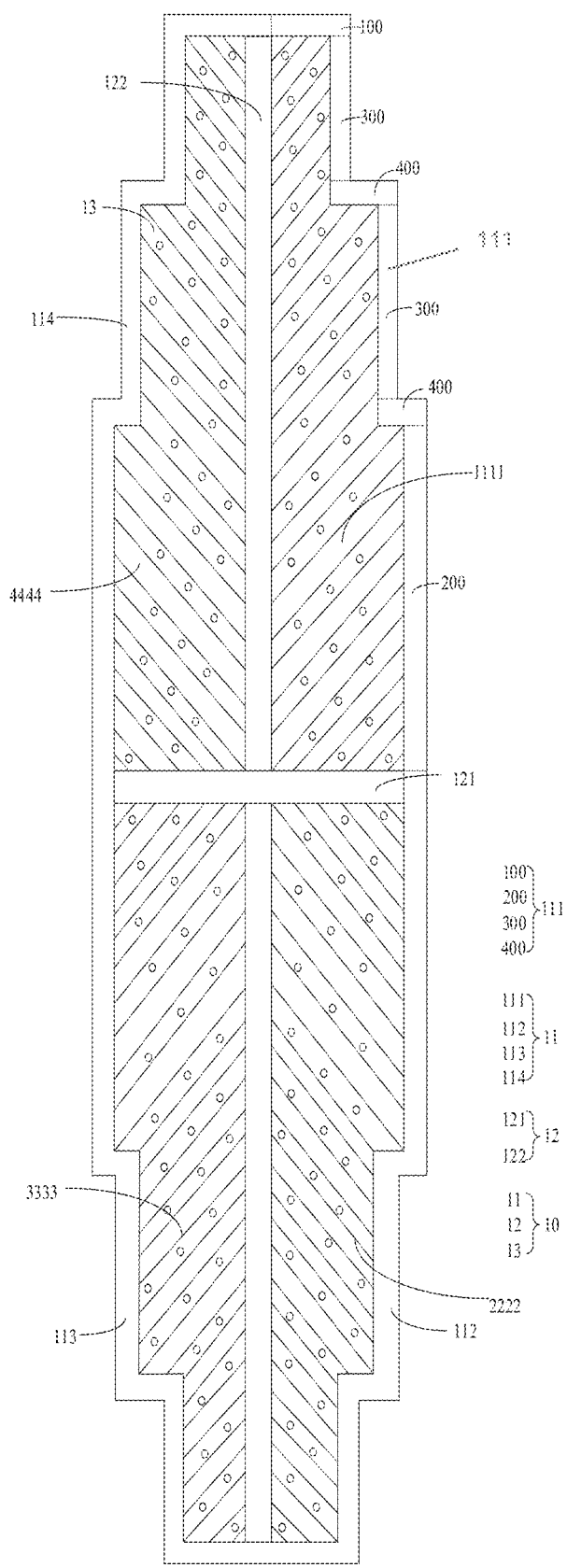
FIG. 7 is a schematic diagram of a third structure of the pixel electrode provided in an embodiment of the invention.

FIG. 7 is a schematic diagram of a third structure of the pixel electrode provided by an embodiment of the invention. Referring to FIG. 7, the structure of the pixel electrode 10 shown in FIG. 7 is similar to the pixel electrode 10 shown in FIG. 4, a difference is that a connection segment of the pixel electrode 10 shown in FIG. 7 comprises N groups of connection sub segments, the number N is an integer greater than or equal to 2, each of the connection sub segments comprises a third sub segment 300 parallel to the second sub segment 200 and a fourth sub segment 400 parallel to the first sub segment 100, the third sub segment 300 and the fourth sub segment 400 are vertically connected, a free end of the third sub segment 300 of a first connection sub segment group is connected with the first sub segment 100, a free end of the fourth sub segment 400 of a $N_{th}$ connection sub segment group is connected with the second sub segment 200, and a free end of the third sub segment 300 of a $M_{th}$ connection sub segment group is connected with a free end of the fourth sub segment 400 of a $(M-1)_{th}$ connection sub segment group, wherein the number M is any integer greater than 1 and less than or equal to the number N, a distance between the first sub segment 100 and the first trunk 121 is greater than a distance between any of the fourth sub segments 400 and the first trunk 121, and a distance between the fourth sub segment 400 of the $M_{th}$ connection sub segment group and the first trunk 121 is less than a distance between the fourth sub segment 400 of the $(M-1)_{th}$ connection sub segment group and the first trunk 121, a distance between the second sub segment 200 and the second trunk 122 is greater than a distance between any of the third sub segments 300 and the second trunk 122, and a distance between the third sub segment 300 of the $M_{th}$ connection sub segment group and the second trunk 122 is greater than a distance between the third sub segment 300 of the $(M-1)_{th}$ connection sub segment group and the second trunk 122.

Specifically, the connection segment of the pixel electrode 10 shown in FIG. 7 comprises two groups of connection sub segments, a free end of the third sub segment 300 of the first connection sub segment group is connected with the first sub segment 100, a free end of the fourth sub segment 400 of a second connection sub segment group is connected with the second sub segment 200, and a free end of the third sub segment 300 of the second connection sub segment group is connected with a free end of the fourth sub segment 400 of the first connection sub segment group. The distance between the first sub segment 100 and the first trunk 121 is greater than the distance between any of the fourth sub segments 400 and the first trunk 121, the distance between the fourth sub segment 400 of the second connection sub segment group and the first trunk 121 is less than the distance between the fourth sub segment 400 of the first connection sub segment group and the first trunk 121, the distance between the second sub segment 200 and the second trunk 122 is greater than the distance between any of the third sub segments 300 and the second trunk 122, and the distance between the third sub segment 300 of the second connection sub segment group and the second trunk 122 is greater than the distance between the third sub segment 300 of the first connection sub segment group and the second trunk 122.

It can be understood that the structure in FIG. 7 is generally applied to a pixel electrode with a larger length-width ratio than the pixel electrode shown in FIG. 4, so as to improve the light transmittance of the pixel electrode.

Based on the above embodiment, please continue to refer to FIG. 7, a ratio of a distance between the fourth sub segment 400 of the $N_{th}$ connection sub segment group and the first trunk 121 and a distance between the second sub segment 200 and the second trunk 122 is greater than or equal to 1 and less than or equal to 2.5; a ratio of a distance between the first sub segment 100 and the fourth sub segment 400 of the first connection sub segment group and a distance between the third sub segment 300 of the first connection sub segment group and the second trunk 122 is greater than or equal to 2 and less than or equal to 3; and a ratio of a distance between the fourth sub segment 400 of the $(M-1)_{th}$ connection sub segment group and the fourth sub segment 400 of the $M_{th}$ connection sub segment group and a distance between the third sub segment 300 of the $(M-1)_{th}$ connection sub segment group and the second trunk 122 is greater than or equal to 2 and less than or equal to 3.

Specifically, in the pixel electrode 10 shown in FIG. 7, a ratio of a distance between the fourth sub segment 400 of the second connection sub segment group and the first trunk 121 and a distance between the second sub segment 200 and the second trunk 122 is greater than or equal to 1 and less than or equal to 2.5; a ratio of a distance between the first sub segment 100 and the fourth sub segment 400 of the first connection sub segment group and a distance between the third sub segment 300 of the first connection sub segment group and the second trunk 122 is greater than or equal to 2 and less than or equal to 3; and a ratio of a distance between the fourth sub segment 400 of the second connection sub segment group and the fourth sub segment 400 of the first connection sub segment group and a distance between the third sub segment 300 of the first connection sub segment group and the second trunk 122 is greater than or equal to 2 and less than or equal to 3.

Based on the above embodiment, please continue to refer to FIG. 7, a distance between the second sub segment 200 and the third sub segment 300 of the $N_{th}$ connection sub segment group is greater than or equal to 5 μm, and a distance between the third sub segment 300 of the $M_{th}$ connection sub segment group and the third sub segment 300 of the $(M-1)_{th}$ connection sub segment group is greater than or equal to 5 μm.

Specifically, in the pixel electrode 10 shown in FIG. 7, the distance between the second sub segment 200 and the third sub segment 300 of the second connection sub segment group is greater than or equal to 5 μm, and the distance between the third sub segment 300 of the second connection sub segment group and the third sub segment 300 of the first connection sub segment group is greater than or equal to 5 μm.

Figure 8:
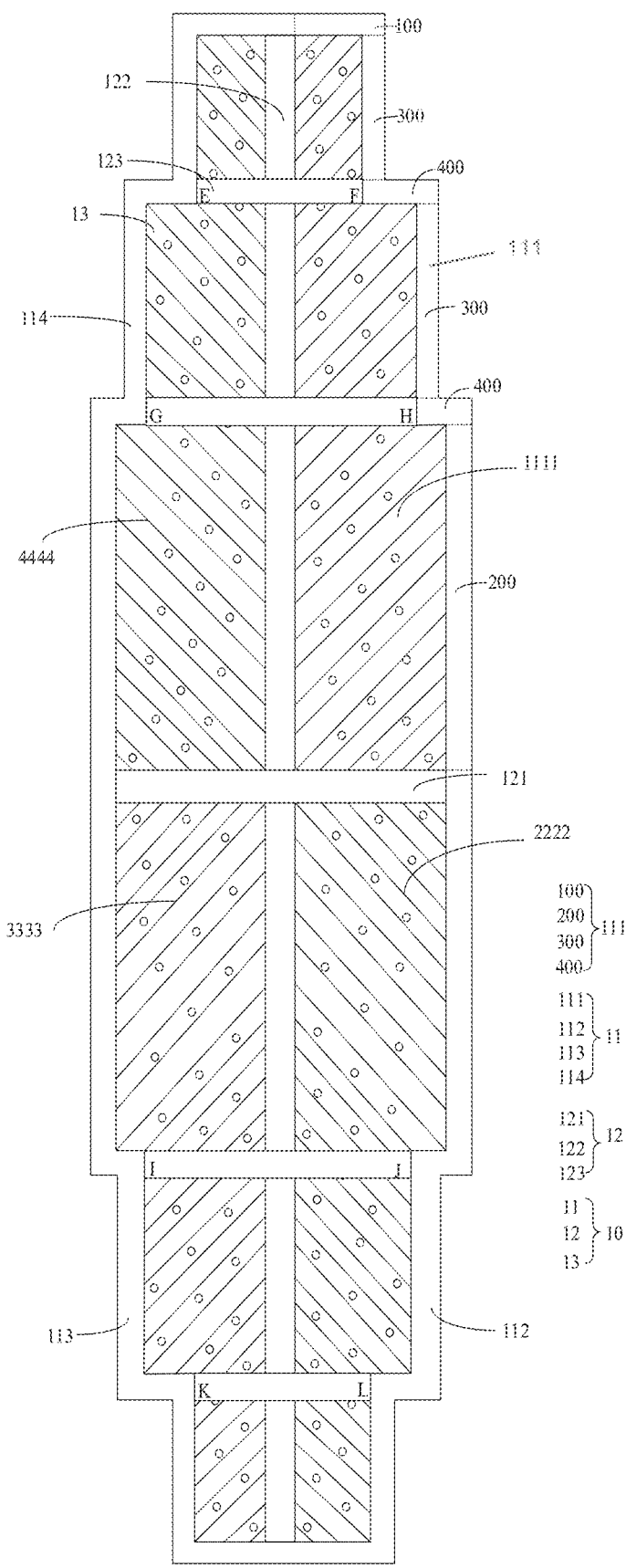
FIG. 8 is a schematic diagram of a fourth structure of the pixel electrode provided in an embodiment of the invention.

FIG. 8 is a schematic diagram of a fourth structure of the pixel electrode provided by an embodiment of the invention. Referring to FIG. 8, the structure of the pixel electrode 10 shown in FIG. 8 is similar to the pixel electrode 10 shown in FIG. 7, a difference is that a keel electrode 12 of the pixel electrode 10 shown in FIG. 8 further comprises at least one third trunk 123, connection points of the third sub segments 300 and the fourth sub segments 400 of the connection sub segment are defined as target connection points, and the third trunk 123 is connected with two of the target connection points which are symmetrical to the second trunk 122.

Specifically, the pixel electrode 10 shown in FIG. 8 comprises four third trunks 123, one end of a first one of the third trunks 123 connects a connection point E of the third sub segment 300 and the fourth sub segment 400 in the fourth segment 114, and the other end connects a connection point F of the third sub segment 300 and the fourth sub segment 400 in the first segment 111; one end of a second one of the third trunks 123 connects a connection point G of the third sub segment 300 and the fourth sub segment 400 in the fourth segment 114, and the other end connects a connection point H of the third sub segment 300 and the fourth sub segment 400 in the first segment 111; one end of a third one of the third trunks 123 connects a connection point I of the third sub segment 300 and the fourth sub segment 400 in the third segment 113, and the other end connects a connection point J of the third sub segment 300 and the fourth sub segment 400 in the second segment 112; and one end of a fourth one of the third trunks 123 connects a connection point K of the third sub segment 300 and the fourth sub segment 400 in the third segment 113, and the other end connects a connection point L of the third sub segment 300 and the fourth sub segment 400 in the second segment 112.

Based on the above embodiment, widths of the first trunk 121, the second trunk 122 and the third trunk 123 in the embodiments of the invention are all 6 μm.

Based on the above embodiment, please refer to FIG. 4, FIG. 6, FIG. 7 or FIG. 8, in an embodiment of the invention, the first trunk 121 and the second trunk 122 divide the closed region into the four sub areas, the pixel electrode 10 further comprises a plurality of branch electrodes 13, the branch electrodes 13 are respectively located in the four sub areas, and the branch electrodes 13 in the same sub area are disposed in interval and arranged in parallel.

Specifically, the four sub areas of the pixel electrode 10 shown in FIG. 4, FIG. 6, FIG. 7 or FIG. 8 are respectively the first sub area 1111, the second sub area 2222, the third sub area 3333 and the fourth sub area 4444, wherein the first sub area 1111 is surrounded by the first trunk 121, the second trunk 122 and the first segment 111, the second sub area 2222 is surrounded by the first trunk 121, the second trunk 122 and the second segment 112, the third sub area 3333 is surrounded by the first trunk 121, the second trunk 122 and the third segment 113, and the fourth sub area 4444 is surrounded by the first trunk 121, the second trunk 122 and the fourth segment 114. Several branch electrodes 13 are respectively arranged in the four sub areas, namely, the several branch electrodes 13 are divided into four branch electrode groups, and the four branch electrode groups are defined as a first branch electrode group, a second branch electrode group, a third branch electrode group and a fourth branch electrode group respectively, all of the branch electrodes 13 in the first branch electrode group are disposed in interval and arranged in parallel in the first sub area 1111, all of the branch electrodes 13 in the second branch electrode group are disposed in interval and arranged in parallel in the second sub area 2222, all of the branch electrodes 13 in the third branch electrode group are disposed in interval and arranged in parallel in the third sub area 3333, and all of the branch electrodes 13 in the fourth branch electrode group are disposed in interval and arranged in parallel in the fourth sub area 4444.

It should be noted that the structure of the pixel electrode 10 shown in FIG. 4 is similar to that of the pixel electrode 10 shown in FIG. 6, a difference is that the pixel electrode 10 shown in FIG. 4 lacks the third trunk 123 compared with the pixel electrode 10 shown in FIG. 6. Therefore, the pixel electrode 10 shown in FIG. 4 is more conducive to forming an electric field in a same direction as an extension direction of the several branch electrodes 13, which is more conducive to the deflection of the liquid crystals and can improve the liquid crystals efficiency.

The structure of the pixel electrode 10 shown in FIG. 7 is similar to that of the pixel electrode 10 shown in FIG. 8, a difference is that the pixel electrode 10 shown in FIG. 7 lacks the third trunk 123 compared with the pixel electrode 10 shown in FIG. 8. Therefore, the pixel electrode 10 shown in FIG. 7 is more conducive to forming an electric field in a same direction as an extension direction of the several branch electrodes 13, which is more conducive to the deflection of the liquid crystals and can improve the liquid crystals efficiency.

Figure 9:
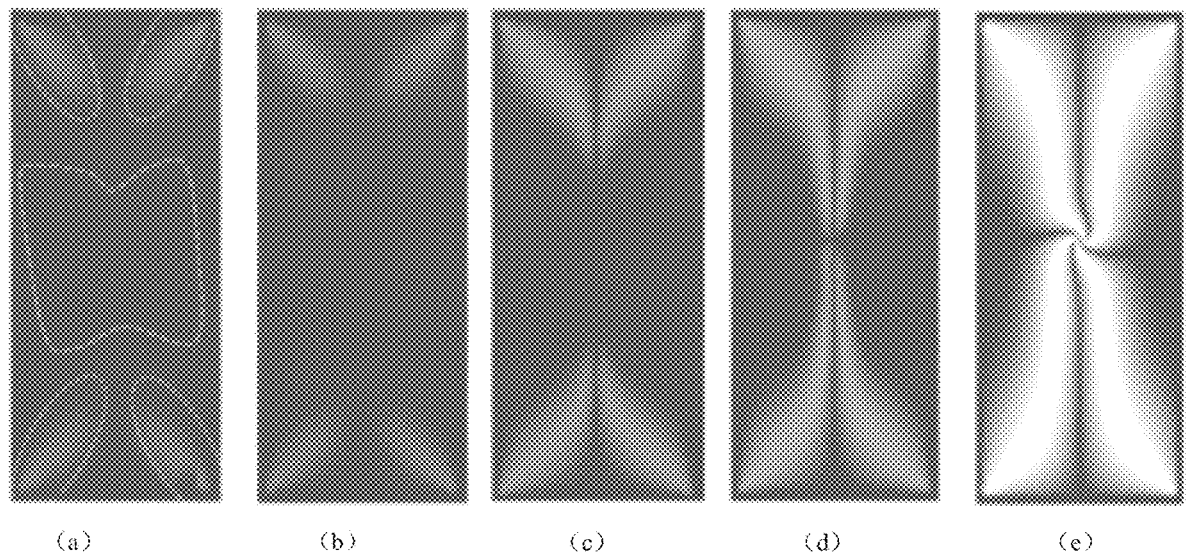
FIG. 9 is a schematic diagram of a deflection of the liquid crystals in the liquid crystal region corresponding to the pixel electrode shown in FIG. 1 under an action of different electric fields.

As a preferred embodiment, an embodiment of the invention illustrates a theoretical derivation process of the pixel electrode 10 with the above structure in combination with FIG. 9. It should be noted that firstly, the rectangular pixel electrode shown in FIG. 9 is provided, as shown in part (a) of FIG. 9, when liquid crystals in the liquid crystal region corresponding to the rectangular pixel electrode is illuminated by a gradually rising voltage difference, there are "strong deflection electric field area" (located in inner areas of dotted boxes of the four right angle areas) which are easy to be normally aligned in the liquid crystal region, and "weak deflection electric field area" (located in inner areas of dotted boxes of the waist area) which are difficult to be normally aligned. Specifically, in a process of a gradual rise of an electric field, as shown in parts (b), (c), (d) and (e) in FIG. 9, the liquid crystals at the four right angles of the pixel electrode first begin to deflect under an action of the electric field, and its long axis deflection angle is consistent with a direction of several branch electrodes in the pixel electrode, under an action of a polarizer, it first transmits light, and with a further rise of the electric field, the "strong deflection electric field area" gradually guides the liquid crystals in the "weak deflection electric field area" to deflect, so a light transmission area gradually diffuses from the four right angle areas of the pixel electrode to the waist area of the pixel electrode, wherein, parts (b), (c), (d) and (e) in FIG. 9 show the deflection of the liquid crystals in the liquid crystal region corresponding to the pixel electrode when the voltage difference is 2.5V, 2.6V, 2.7V, and 5V, respectively.

Figure 3:
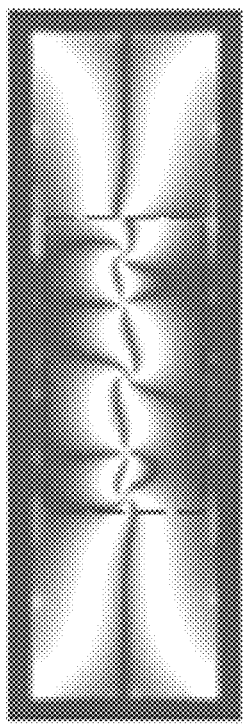
FIG. 3 is a schematic diagram of a deflection of liquid crystals in a corresponding liquid crystal region under an action of a specific electric field when a length-width ratio of the pixel electrode as shown in FIG. 1 is greater than or equal to 3.5.

However, in the pixel electrode, when the right angle area is too far away from the waist area, the strong deflection electric field of the right angle area is difficult to extend to the waist area, so that the deflection of the liquid crystals in the waist area is random, and uncontrollable abnormal dark lines as shown in FIG. 3 appear. Therefore, the pixel electrode 10 as shown in FIG. 4, FIG. 6, FIG. 7 or FIG. 8 can be formed by configuring the right angle area near the "deflection electric field weak area" to reduce a distance between the right angle area and the waist area, so that the strong deflection electric field generated by the configured right angle area can extend to the waist area, thus, liquid crystals in the liquid crystal region corresponding to the rectangular pixel electrode can be normally aligned in the process of being illuminated by the gradually rising voltage difference, and the dark lines in the liquid crystal region can be in a regular cross shape, thereby improving the light transmittance of the pixel electrode.

Figure 5:
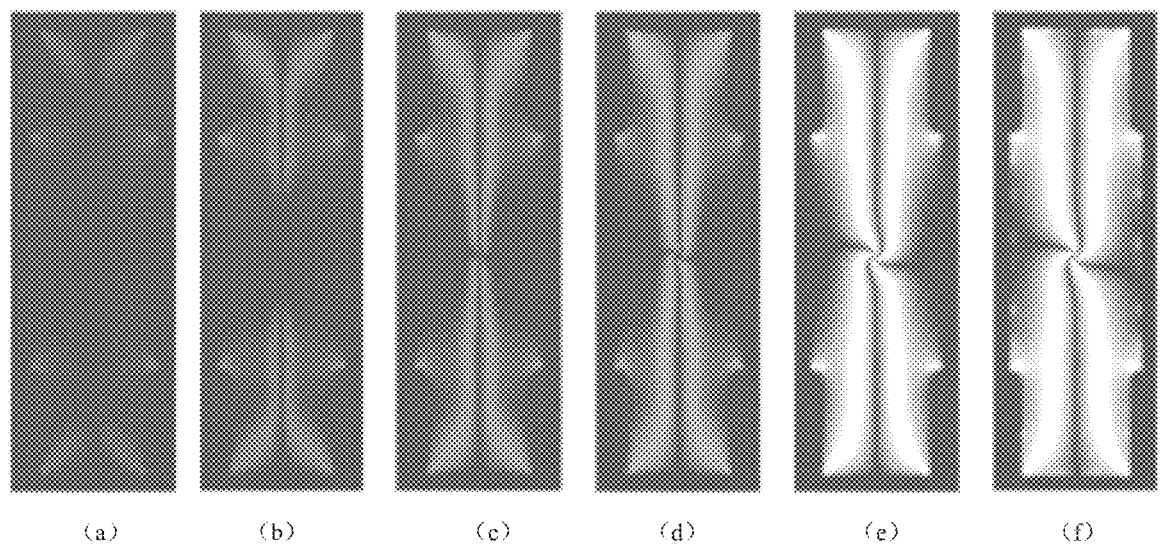
FIG. 5 is a schematic diagram of a deflection of liquid crystals in a liquid crystal region corresponding to the pixel electrode shown in FIG. 4 under an action of different electric fields.

The pixel electrode 10 as shown in FIG. 4 is formed after the right angle area is arranged near the "deflection electric field weak area", during the gradual rise of the electric field, numbers of the "strong deflection electric field area" in the liquid crystal region corresponding to the pixel electrode 10 increases to 8 as shown in FIG. 5, in which, the strong deflection electric field in the right angle area near the waist area can guide the deflection of the liquid crystals in the "weak deflection electric field area" of the waist area, so that the liquid crystals in the liquid crystal region corresponding to the pixel electrode 10 can be normally aligned in the process of being illuminated by the gradually rising voltage difference, thereby the dark lines in the liquid crystal region are in a regular cross shape, thus improving the light transmittance of the pixel electrode.

Based on the above embodiment, an embodiment of the invention also provides a driving method of the pixel electrode. The driving method of the pixel electrode is used to drive the pixel electrode described in any of the above embodiments. The pixel electrode comprises a right angle area in an edge of the pixel electrode and a waist area located in a middle of the pixel electrode. The driving method of the pixel electrode comprises:

Applying a voltage to the pixel electrode so that a deflection electric field of the right angle area guides a deflection of liquid crystals of the waist area to improve the penetration rate of the pixel electrode. It should be noted that a working principle of the above-mentioned pixel electrode after applying voltage has been described in detail in the embodiment, and it will not be described here.

Figure 10:
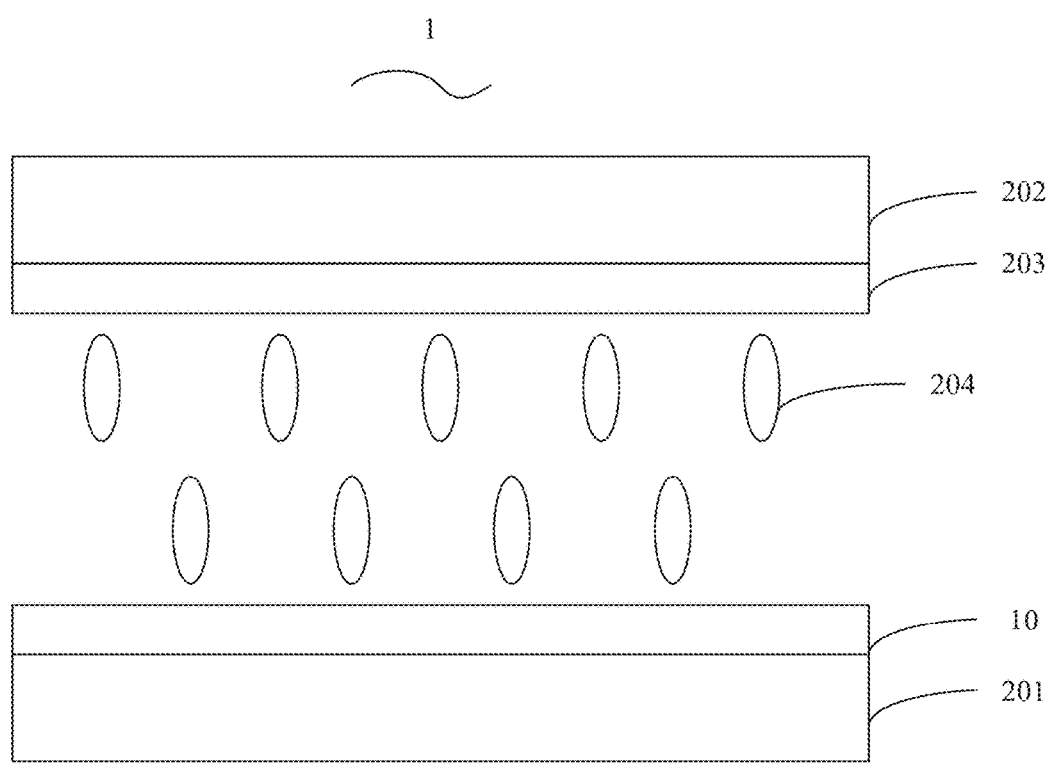
FIG. 10 is a schematic diagram of a liquid crystal display panel provided in an embodiment of the invention.

Based on the above embodiment, please refer to FIG. 10, an embodiment of the invention also provides a liquid crystal display panel 1, the liquid crystal display panel 1 comprises the pixel electrode 10 described in any of the above embodiments. It should be noted that the above embodiments have described a structure and a function of the pixel electrode 10 in detail, and it will not be repeated here.

Based on the above embodiment, the liquid crystal display panel 1 of the embodiment of the invention also comprises a thin film transistor array substrate 201, a color film substrate 202 arranged opposite to the thin film transistor array substrate 201, the pixel electrode 10 arranged on one side of the thin film transistor array substrate 201 facing the color film substrate 202, and a common electrode 203 arranged on one side of the color film substrate 202 facing the thin film transistor array substrate 201, and a liquid crystal layer 204 sandwiched between the pixel electrode 10 and the common electrode 203.

It can be understood that for those skilled in the art, equivalent replacements or changes can be made according to the technical solutions of the present application and its application concept, and all these changes or replacements shall fall within a protection scope of claims attached to the present application.

What is claimed is:

1. A pixel electrode, wherein the pixel electrode comprises a frame electrode and a keel electrode, the frame electrode forms a closed region, the keel electrode is located in the closed region, the keel electrode comprises at least a first trunk and a second trunk vertically intersecting the first trunk, the first trunk and the second trunk divide the closed region into four sub areas, and a shape of an area composed of any two adjacent sub areas is pagoda shaped, to improve a light transmittance of the pixel electrode;

wherein the first trunk and the second trunk divide the frame electrode into four segments, the four segments are arranged symmetrical to an intersection of the first trunk and the second trunk, each of the four segments comprises a first sub segment parallel to the first trunk, a second sub segment parallel to the second trunk, and a connection segment connecting the first sub segment and the second sub segment, the connection segment comprises a group of connection sub segments, the connection sub segments comprise a third sub segment parallel to the second sub segment and a fourth sub segment parallel to the first sub segment, the third sub segment and the fourth sub segment are vertically connected, a free end of the third sub segment is connected with the first sub segment, a free end of the fourth sub segment is connected with the second sub segment, a distance between the first sub segment and the first trunk is greater than a distance between the fourth sub segment and the first trunk, and a distance between the second sub segment and the second trunk is greater than a distance between the third sub segment and the second trunk.

2. The pixel electrode according to claim 1, wherein the first trunk and the second trunk divide the frame electrode into four segments, the four segments are arranged to be symmetrical to an intersection of the first trunk and the second trunk, each of the four segments comprises a first sub segment parallel to the first trunk, a second sub segment parallel to the second trunk, and a connection segment connecting the first sub segment and the second sub segment, the connection segment comprises N groups of connection sub segments, the number N is an integer greater than or equal to 2, each of the connection sub segments comprises a third sub segment parallel to the second sub segment and a fourth sub segment parallel to the first sub segment, the third sub segment and the fourth sub segment are vertically connected, a free end of the third sub segment of a first connection sub segment group is connected with the first sub segment, a free end of the fourth sub segment of a $N_{th}$ connection sub segment group is connected with the second sub segment, and a free end of the third sub segment of a $M_{th}$ connection sub segment group is connected with a free end of the fourth sub segment of a $(M-1)_{th}$ connection sub segment group, wherein the number M is any integer greater than 1 and less than or equal to the number N, a distance between the first sub segment and the first trunk is greater than a distance between any of the fourth sub segments and the first trunk, and a distance between the fourth sub segment of the $M_{th}$ connection sub segment group and the first trunk is less than a distance between the fourth sub segment of the $(M-1)_{th}$ connection sub segment group and the first trunk, a distance between the second sub segment and the second trunk is greater than a distance between any of the third sub segments and the second trunk, and a distance between the third sub segment of the $M_{th}$ connection sub segment group and the second trunk is greater than a distance between the third sub segment of the $(M-1)_{th}$ connection sub segment group and the second trunk.

3. The pixel electrode according to claim 1, wherein a ratio of the distance between the fourth sub segment and the first trunk to the distance between the second sub segment and the second trunk is greater than or equal to 1 and less than or equal to 2.5, and a ratio of the distance between the first sub segment and the fourth sub segment to the distance between the third sub segment and the second trunk is greater than or equal to 2 and less than or equal to 3.

4. The pixel electrode according to claim 2, wherein a ratio of a distance between the fourth sub segment of the $N_{th}$ connection sub segment group and the first trunk and the distance between the second sub segment and the second trunk is greater than or equal to 1 and less than or equal to 2.5, a ratio of a distance between the first sub segment and the fourth sub segment of the first connection sub segment group and a distance between the third sub segment of the first connection sub segment group and the second trunk is greater than or equal to 2 and less than or equal to 3, and a ratio of a distance between the fourth sub segment of the $(M-1)_{th}$ connection sub segment group and the fourth sub segment of the $M_{th}$ connection sub segment group and a distance between the third sub segment of the $(M-1)_{th}$ connection sub segment group and the second trunk is greater than or equal to 2 and less than or equal to 3.

5. The pixel electrode according to claim 1, wherein a distance between the second sub segment and the third sub segment is greater than or equal to 5 μm.

6. The pixel electrode according to claim 2, wherein a distance between the second sub segment and the third sub segment of the $N_{th}$ connection sub segment group is greater than or equal to 5 μm, and a distance between the third sub segment of the $M_{th}$ connection sub segment group and the third sub segment of the $(M-1)_{th}$ connection sub segment group is greater than or equal to 5 μm.

7. The pixel electrode according to claim 1, wherein connection points of the third sub segments and the fourth sub segments of the connection sub segment are defined as target connection points, the keel electrode further comprises at least one third trunk, and the third trunk is connected with two of the target connection points which are symmetrical to the second trunk.

8. The pixel electrode according to claim 1, wherein the pixel electrode further comprises a plurality of branch electrodes, the branch electrodes are respectively located in the four sub areas, and the branch electrodes in the same sub area are disposed in interval and arranged in parallel.

9. A driving method of a pixel electrode, wherein the driving method of the pixel electrode is used for driving the pixel electrode according to claim 1, the pixel electrode comprises a right angle area located in an edge of the pixel electrode and a waist area located in a middle of the pixel electrode, and the driving method of the pixel electrode comprises:

applying a voltage to the pixel electrode so that a deflection electric field of the right angle area guides a deflection of liquid crystals of the waist area to improve the light transmittance of the pixel electrode.

10. A liquid crystal display panel, wherein the liquid crystal display panel comprises a pixel electrode, the pixel electrode comprises a frame electrode and a keel electrode, the frame electrode forms a closed region, the keel electrode is located in the closed region, the keel electrode comprises at least a first trunk and a second trunk vertically intersecting the first trunk, the first trunk and the second trunk divide the closed region into four sub areas, and a shape of an area composed of any two adjacent sub areas is pagoda shaped, to improve a light transmittance of the pixel electrode;

wherein the first trunk and the second trunk divide the frame electrode into four segments, the four segments are arranged symmetrical to an intersection of the first trunk and the second trunk, each of the four segments comprises a first sub segment parallel to the first trunk, a second sub segment parallel to the second trunk, and a connection segment connecting the first sub segment and the second sub segment, the connection segment comprises a group of connection sub segments, the connection sub segments comprise a third sub segment parallel to the second sub segment and a fourth sub segment parallel to the first sub segment, the third sub segment and the fourth sub segment are vertically connected, a free end of the third sub segment is connected with the first sub segment, a free end of the fourth sub segment is connected with the second sub segment, a distance between the first sub segment and the first trunk is greater than a distance between the fourth sub segment and the first trunk, and a distance between the second sub segment and the second trunk is greater than a distance between the third sub segment and the second trunk.

11. The liquid crystal display panel according to claim 10, wherein the first trunk and the second trunk divide the frame electrode into four segments, the four segments are arranged to be symmetrical to an intersection of the first trunk and the second trunk, each of the four segments comprises a first sub segment parallel to the first trunk, a second sub segment parallel to the second trunk, and a connection segment connecting the first sub segment and the second sub segment, the connection segment comprises N groups of connection sub segments, the number N is an integer greater than or equal to 2, each of the connection sub segments comprises a third sub segment parallel to the second sub segment and a fourth sub segment parallel to the first sub segment, the third sub segment and the fourth sub segment are vertically connected, a free end of the third sub segment of a first connection sub segment group is connected with the first sub segment, a free end of the fourth sub segment of a $N_{th}$ connection sub segment group is connected with the second sub segment, and a free end of the third sub segment of a $M_{th}$ connection sub segment group is connected with a free end of the fourth sub segment of a $(M-1)_{th}$ connection sub segment group, wherein the number M is any integer greater than 1 and less than or equal to the number N, a distance between the first sub segment and the first trunk is greater than a distance between any of the fourth sub segments and the first trunk, and a distance between the fourth sub segment of the $M_{th}$ connection sub segment group and the first trunk is less than a distance between the fourth sub segment of the $(M-1)_{th}$ connection sub segment group and the first trunk, a distance between the second sub segment and the second trunk is greater than a distance between any of the third sub segments and the second trunk, and a distance between the third sub segment of the $M_{th}$ connection sub segment group and the second trunk is greater than a distance between the third sub segment of the $(M-1)_{th}$ connection sub segment group and the second trunk.

12. The liquid crystal display panel according to claim 10, wherein a ratio of the distance between the fourth sub segment and the first trunk to the distance between the second sub segment and the second trunk is greater than or equal to 1 and less than or equal to 2.5, and a ratio of the distance between the first sub segment and the fourth sub segment to the distance between the third sub segment and the second trunk is greater than or equal to 2 and less than or equal to 3.

13. The liquid crystal display panel according to claim 11, wherein a ratio of a distance between the fourth sub segment of the $N_{th}$ connection sub segment group and the first trunk and the distance between the second sub segment and the second trunk is greater than or equal to 1 and less than or equal to 2.5, a ratio of a distance between the first sub segment and the fourth sub segment of the first connection sub segment group and a distance between the third sub segment of the first connection sub segment group and the second trunk is greater than or equal to 2 and less than or equal to 3, and a ratio of a distance between the fourth sub segment of the $(M-1)_{th}$ connection sub segment group and the fourth sub segment of the $M_{th}$ connection sub segment group and a distance between the third sub segment of the $(M-1)_{th}$ connection sub segment group and the second trunk is greater than or equal to 2 and less than or equal to 3.

14. The liquid crystal display panel according to claim 10, wherein a distance between the second sub segment and the third sub segment is greater than or equal to 5 μm.

15. The liquid crystal display panel according to claim 11, wherein a distance between the second sub segment and the third sub segment of the $N_{th}$ connection sub segment group is greater than or equal to 5 μm, and a distance between the third sub segment of the $M_{th}$ connection sub segment group and the third sub segment of the $(M-1)_{th}$ connection sub segment group is greater than or equal to 5 μm.

16. The liquid crystal display panel according to claim 10, wherein connection points of the third sub segments and the fourth sub segments of the connection sub segment are defined as target connection points, the keel electrode further comprises at least one third trunk, and the third trunk is connected with two of the target connection points which are symmetrical to the second trunk.

17. The liquid crystal display panel according to claim 10, wherein the pixel electrode further comprises a plurality of branch electrodes, the branch electrodes are respectively located in the four sub areas, and the branch electrodes in the same sub area are disposed in interval and arranged in parallel.

18. The liquid crystal display panel according to claim 10, wherein the liquid crystal display panel further comprises a thin film transistor array substrate, a color film substrate arranged opposite to the thin film transistor array substrate, a common electrode arranged on one side of the color film substrate facing the thin film transistor array substrate, and a liquid crystal layer sandwiched between the pixel electrode and the common electrode, wherein the pixel electrode arranged on one side of the thin film transistor array substrate facing the color film substrate.

* * * * *